United States Patent Office

2,987,531
PREPARATION OF CYCLOPENTADIENYL MANGANESE COMPOUNDS FROM TRIS (CYCLOPENTADIENYL) GROUP III–A METAL COMPOUNDS

Hymin Shapiro and Earl G. De Witt, Baton Rouge, La., and Jerome E. Brown, Detroit, Mich., assignors to Ethyl Corporation, New York, N.Y., a corporation of Delaware
No Drawing. Filed Apr. 25, 1958, Ser. No. 730,818
3 Claims. (Cl. 260—429)

This invention relates to hydrocarbon manganese compounds and to a particularly novel process for their preparation. This application is a continuation-in-part of our application Serial No. 297,392 filed July 5, 1952.

Attendant with the development and evolution of the internal combustion engine for passenger cars and heavy-duty service, the petroleum industry has been continually called upon to effect improvements in the antiknock quality of hydrocarbon fuels. These improvements have, in general, been brought about by two distinct methods. One of these methods comprises improvements in refining operations such as thermal and catalytic cracking and reforming or alkylating processes. The other method comprises the use of fuel additives to effect an increase in the antiknock qualities of the hydrocarbon fuels. Inasmuch as improvements in refinery techniques involve considerable capital expenditures, the use of fuel additives has attained greater and more widespread acceptance as the more effective method, particularly from the economic standpoint. The instant invention is therefore concerned with providing a novel process for the manufacture of hydrocarbon manganese compounds useful as additives to fuel and lubricating oils and also useful in the synthesis of other manganese compounds which are capable of improving combustion characteristics of hydrocarbon fuels and as additives to lubricating oils and greases, and the like.

It is therefore an object of our invention to provide a novel process for manufacture of hydrocarbon manganese compounds. It is a further object of this invention to provide cyclopentadienyl manganese compounds, and particularly such compounds which are suitable for manufacture of cyclopentadienyl manganese tricarbonyl compounds, useful as addtives for liquid and solid combustion fuels, and lubricating oils and greases, as well as for other uses. Additional important objects of this invention will become apparent from the discussion which follows.

The objectives of this invention are accomplished by a process which comprises reacting a group III–A metal tris-(cyclomatic hydrocarbon) compound having from 3 to about 17 carbon atoms and which embodies a group of 5 carbons having the general configuration found in cyclopentadiene with a manganese compound, and subsequently recovering a stable cyclopentadienyl manganese compound. By a stable cyclopentadienyl manganese compound is meant a compound which when heated in an inert atmosphere, does not decompose at temperatures below about 200 C.

More specifically, the process of this invention comprises reacting a tris(cyclomatic) group III–A metal compound with a manganese compound in a suitable solvent or complexing medium at a temperature of from about 0 to 250° C., preferably from 50° to 200° C. The tris(cyclomatic) metal compound and the manganese compound are normally used in about stoichiometric quantities, although in general the proportions can range from about 0.5 to about 2 moles of the tris(cyclomatic) metal compound per mole of the manganese compound. In most cases a slight excess of the manganese compound is preferred, usually from about 0.1 to 10 percent. The reaction is normally conducted at about atmospheric pressure. However, if a low boiling solvent is employed, pressure is frequently used in order to maintain the solvent in a liquid phase at reaction temperature. Also, even when high boiling solvents are employed, it is frequently desirable to maintain a slight pressure of an inert gas in the reactor vessel to prevent moist air from entering the reactor. However, the reaction can be conducted when desired at subatmospheric pressure. The solvent can be employed in a wide range of proportions, usually from 0.1 to 20 moles of solvent per mole of reactants. The more usual concentration of solvent is from 0.5 to 2 parts of solute per part per 1000 parts solution.

The effectiveness of tris(cyclopentadienyl) group III–A metals in the manufacture of cyclopentadienyl manganese compounds is very surprising and is also of particular economic significance. In contrast to the use of alkali or alkaline earth cyclopentadienyl compounds, the tris-(cyclomatic) aluminum compounds can be reacted effectively with manganese compounds in hydrocarbon solvents, the aromatic hydrocarbon solvents being particularly effective. These solvents are much less dangerous than ether solvents and, in general, are more economical.

In addition to permitting the use of more desirable solvents, the use of group III–A metal tris(cyclopentadienyl) compounds is considerably more economical due to the fact that three cyclopentadienyl groups can be exchanged with the manganese metal per atom of group III–A metal. Thus, in the case of aluminum, a very light metal, the utilization of metal is greatly improved over the use of a monovalent metal, such as sodium.

The products of process of this invention have the general formula $$RMnR'$$

wherein R and R' can be the same or different and are cyclomatic hydrocarbon radicals as defined above, said compound being further characterized in that the cyclomatic hydrocarbon radical is bonded to the manganese through the carbons comprising the cyclopentadienyl group configuration. The cyclomatic ring can be substituted, the hydrocarbon substituents preferably containing from 1 to about 12 carbon atoms. However, radicals in which the substituents have from 1 to about 20 or more carbon atoms are also applicable to the process of this invention.

The cyclomatic groups of the compounds of the present invention can be represented by four general formulae as follows:

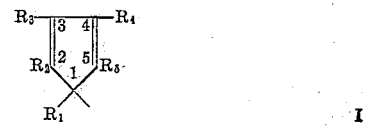

I

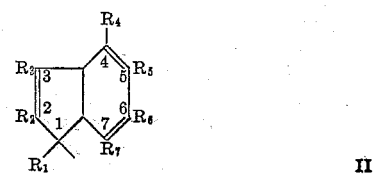

II

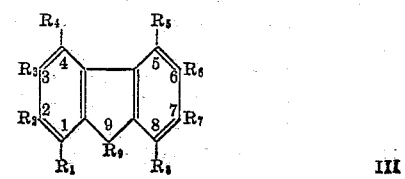

III

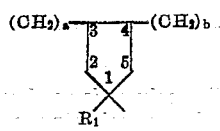

$$\text{IV}$$

wherein each of $R_1$, $R_2$, $R_3$, $R_4$, $R_5$, $R_6$, $R_7$, $R_8$, and $R_9$ can be the same or different and is selected from the group consisting of hydrogen and organic and hydrocarbon radicals having from 1 to 12 or more carbon atoms, and wherein $a$ and $b$ can be the same or different and are small whole integers including 0 and excluding 1, the sum $a+b$ being at least 2.

Non-limiting examples of the compounds made by this invention in which the cyclomatic radical has the configuration shown in Structure I above are bis(cyclopentadienyl)manganese; bis(methylcyclopentadienyl)manganese; bis(ethylcyclopentadienyl)manganese; bis(propylcyclopentadienyl)manganese; bis(butenylcyclopentadienyl)manganese; bis(t-butylcyclopentadienyl)manganese; bis(hexylcyclopentadienyl)manganese; bis(cyclohexylcyclopentadienyl)manganese; bis(heptylcyclopentadienyl)-mnganese; bis(decylcyclopentadienyl)manganese; bis(dodecylcyclopentadienyl)manganese; bis(1,2,3,4-tetramethylcyclopentadienyl)manganese; bis(1,2,3,4,5-pentamethylcyclopentadienyl)manganese; bis(1,3-dibutylcyclopentadienyl)manganese; bis(1,2,-dipropyl-3-cyclohexylcyclopentadienyl)manganese; bis(tolylcyclopentadienyl)manganese; bis(1,3-diphenylcyclopentadienyl)manganese; bis(acetylcyclopentadienyl)manganese; cyclopentadienyl(methylcyclopentadienyl)manganese; cyclopentadienyl(indenyl)manganese, and the like.

When there is only one organo or hydrocarbon substituent on the cyclopentadienyl ring, its position is not specified since, according to theory, the cyclopentadienyl ring or group is bonded to the manganese by five equivalent bonds running from each of the five carbons in the cyclopentadienyl ring to the manganese. Since all these bonds are equivalent and all five carbons in the ring are equidistant from the manganese, it is immaterial to which of the five carbons a single substituent is attached. When, however, more than one substituent is attached to the cyclopentadienyl ring, the positions are given so as to indicate the relative positions of the different substituents with respect to each other on the cyclopentadienyl ring.

Examples of compounds having the configuration of Structure II given hereinabove are bis(indenyl)mananese; bis(3-methylindenyl)manganese; bis(3-ethylindenyl)manganese; bis(2,3-dimethylindenyl)manganese; bis(1,3-diethylindenyl)manganese; bis(1,7-isopropylindenyl)manganese; bis(1,2,3,4,5,6,7-hepta-methylindenyl)manganese, etc.

Examples of compounds having the configuration of Structure III above are bis(fluorenyl)manganese; bis(3-ethylfluorenyl)manganese; bis(4-propylfluorenyl)manganese; bis(2,3,4,7-tetramethylfluorenyl)manganese, and the like.

Examples of compounds having the configuration of Structure IV above are bis(4,5,6,7-tetrahydroindenyl)manganese; bis-(3-methyl-4,7-dihydroindenyl)manganese; bis (2-ethyl-3-phenyl-4,5,6,7-tetrahydroindenyl) manganese; bis (1,2,3,4,5,6,7,8-octahydrofluorenyl) manganese; bis(1,4,5,8-tetrahydrofluorenyl)manganese, and the like.

The manganese compounds employed in the process of this invention are oxides, sulfides, alkoxides, phenoxides and salts or organic or inorganic acids, preferably the respective manganous salts. Examples of these manganese compounds are manganous acetate, manganous benzoate, manganous carbonate, manganous oxalate, manganous lactate, manganous nitrate, manganous phosphate, manganous sulfate, manganic phosphate, maganous fluoride, manganese chloride, manganous bromide, manganous iodide, manganous ethoxide, manganous propoxide, manganous phenoxide, manganous thiophenoxide, and the like. In addition, manganous salts of β-diketones such as tri(2,4-pentanedione)manganese and tris (2,4-hexanedione) manganese may also be employed, as well as manganese salts of β-keto esters, such as the manganese salts of ethylacetoacetate, and the like. Tris (cyclomatic) group III-A metal compounds are also reacted with naturally occurring manganese ores, such as manganosite (MnO), manganese dioxide ($MnO_2$), manganic sesquioxide ($Mn_2O_3$), manganous sulfide (MnS), manganic sulfide ($MnS_2$), rhodochrosite ($MnCO_5$), and the like, to give bis(cyclomatic)manganese compounds such as bis(methylcyclopentadienyl) manganese, etc.

Ethers and amines are useful as solvents in the present process. Typical examples of ethers are dimethyl ether, methyl ethyl ether, methyl isopropyl ether, di-isopropyl ether or a mixture of these ethers. Poly ethers are also suitable in the present invention and include ethylene glycol diethers and polyethylene glycol diethers, the diethylene glycol ethers being preferred. Typical examples are ethylene glycol dimethyl ether, ethylene glycol methyl ethyl ether, ethylene glycol diethyl ether, ethylene glycol methyl butyl ether, ethylene glycol butyl lauryl ether and the like. Typical examples of the preferred diethylene glycol diethyl ethers are the dimethyl, ethyl methyl, diethyl, ethyl butyl, dibutyl, and butyl lauryl ethers. Best results are obtained with alkyl groups of from 1 to 6 carbon atoms.

Other suitable ethers are triethylene glycol ethers such as dimethyl, diethyl, methyl ethyl, etc., glycerol ethers such as trimethyl dimethyl ethyl, diethyl methyl, etc., and cyclic ethers such as dioxane, tetrahydrofuran, methyl glycerol formal and dimethylene pentaderythrite.

A wide variety of amines are suitable for use as solvents in the present invention, including both aliphatic and aromatic amines. Typical examples are dimethyl amine, trimethyl amine, dimethyl ethyl amine, aniline, methyl aniline, dimethyl aniline, N-methyl morpholine, cyclohexylamine and the like.

The tris(cyclomatic) group III-A metal compound used in the present process can be prepared by the reaction of a cyclomatic mercury compound with a group III-A metal. The process is carried out in an inert atmosphere, such as nitrogen, argon, helium, methane, etc., to prevent axidation due to oxygen in the air. For example, tris(cyclopentadienyl)aluminum can be prepared by reacting powdered alumiuum with bis(cyclopentadienyl) mercury, in a solvent such as toluene.

A preferred embodiment of this present invention is a process which comprises reacting a group III-A metal tris-(cyclomatic hydrocarbon) compound, as defined above, with a manganese compound, then reacting the bis(cyclomatic)manganese compound thus prepared with carbon monoxide and subsequently separating a thermally stable cyclomatic manganese tricarbonyl compound such as cyclopentadienyl manganese tricarbonyl. This embodiment of the invention is preferred as it leads to products which are highly useful as antiknock additives to gasoline for use in spark ignition internal combustion engines.

The above carbonylation reaction can be conducted with a wide range of carbon monoxide pressure, usually from about atmospheric to about 10,000 p.s.i.g. A more preferred pressure is from about 100 p.s.i.g. to about 1000 p.s.i.g. Higher pressures can be employed to obtain even faster reaction rates but usually the additional cost of high pressure reactor equipment does not justify the minor improvements obtained in the process. Likewise, lower carbon monoxide pressures can be used but the rate of reaction is frequently unduly slow for economical manufacture. In addition to gaseous carbon monoxide, other sources can be employed, such as metal carbonyls, e.g. iron or manganese carbonyls, which decompose under reaction conditions to give gaseous carbon monoxide.

The carbonylation reaction can be conducted at temperatures of from 0 to 250° C., a preferred temperature range being from about 100° to 225° C. The reaction rate increases at higher temperatures and, in effect, the upper temperature limit is controlled by the thermal stability of the reactants and product. Lower temperatures can sometimes be employed except that the rate of reaction is rather slow.

Normally, the reaction mixture formed from the group III–A metal tris(cyclopentadienyl) compound, and the manganese compound is used directly in the carbonylation reaction. In such cases, it is usually preferred to conduct the reaction in the same solvent as is employed in the intermediate reaction. However, a wide variety of other solvents can be used for carbonylation reaction when the bis(cyclopentadienyl)manganese intermediate compound is isolated. Of these, hydrocarbon solvents are particularly satisfactory including aliphatic hydrocarbons having up to about 18 carbon atoms, e.g. hexane, octane, decane, cyclohexane and the like, and aromatic solvents such as benzene, toluene, xylene, ethyl benzene, naphthalene and various alkylated naphthalenes. Diphenyl is also used as a solvent in this reaction. A particularly useful solvent is the dimer of certain of the cyclopentadiene compounds, such as cyclopentadiene and methylcyclopentadiene dimers.

Various catalysts, complexing agents or other reaction modifying substances can be used in the above reaction without departing from this invention.

The cyclomatic manganese product can be separated from the reaction mixture by steam or vacuum distillation to separate the volatile components from the inorganic or polymeric impurities. The solvent and any volatile impurities can be removed from the product by fractional distillation and the product further purified by an additional fractional distillation or sublimation. The method of preparation is further illustrated in the examples below.

*Example I*

A mixture of 7.94 parts manganous isopropoxide and 6.79 parts tris(cyclopentadienyl) aluminum in 170 parts of dry toluene was stirred at reflux temperature for a period of two hours under a nitrogen atmosphere. The resulting mixture, containing bis(cyclopentadienyl)manganese, as determined by analysis of a small aliquot, was transferred to a pressure reactor. Carbon monoxide was introduced to a pressure of 700 p.s.i.g. at a mixture temperature of 165° C. The reaction mixture was then stirred at 165° C. for four hours. The pressure was maintained at 700 p.s.i.g. by introduction of addition carbon monoxide when needed. The cooled product slurry was steam distilled. Extraction of the steam distillate with 43 parts of toluene gave a yellow solution which, on anlysis for manganese metal was shown to contain 2.36 parts of cyclopentadienyl manganese tricarbonyl (48% yield). Distillation of the toluene, followed by sublimation at reduced pressure, yielded 2.32 parts bright yellow crystalline product.

*Example II*

A bis(cyclopentadienyl)manganese reaction mixture was prepared from 5.76 parts managous chloride and 6.79 parts tris(cyclopentadienyl)aluminum in 170 parts toluene and carbonylated as in Example I. The product, cylopentadienyl manganese tricarbonyl, was separated as a yellow crystalline sublimate from the reaction mixture steam distillate. Melting point of the product was 73.5–76.5° C.

*Example III*

The procedure of Example II was carried out except that 100 parts diethylene gylcol dimethyl ether was used as solvent. Cyclopentadienyl manganese tricarbonyl was again separated from the reaction mixture by steam distillation followed by sublimation.

*Example IV*

Tris(methylcyclopentadienyl)gallium, 15.3 parts is allowed to react with 13 parts anhydrous manganous acetate for two hours in 200 parts dry 1,3-dioxane at reflux to form bis(methylcyclopentadienyl)manganese. Carbon monoxide under 3000 p.s.i. pressure is then applied to the mixture at a temperature of 150° C. until absorption is complete. Distillation of solvent at atmospheric pressure followed by vacuum distillation yields methylcyclopentadienyl manganese tricarbonyl.

*Example V*

Example I is repeated except that manganous acetylacetonate (19 parts) is reacted with tris(ethylcyclopentadienyl) boron (10 parts) in 160 parts of benzene. The reaction mixture is refluxed for four hours. The bis-(ethylcyclopentadienyl)manganese is recovered in good yield.

The product above is carbonylated using 750 p.s.i.g. carbon monoxide pressure at 165° C. to form ethylcyclopentadienyl manganese tricarbonyl.

*Example VI*

Example I is repeated except that tris(idenyl) thallium (27.5 parts) is reacted with manganous ethoxide (10.9 parts) in 1,2-dimethoxyethane. This reaction mixture is stirred for three hours at reflux. The bis(indenyl)manganese product is obtained in excellent yield. This product is carbonylated at 120° C. using 4500 p.s.i.g. carbon monoxide, to form indenyl manganese tricarbonyl.

*Example VII*

Tris(phenylcyclopentadienyl)indium (26.9 parts) is reacted with manganous benzoate (22.2 parts) in accordance with the procedure of Example I in dicyclohexylamine solvent at reflux temperature. The reaction is essentially complete after five hours. The bis(phenylcyclopentadienyl)manganese is obtained in excellent yield.

*Example VIII*

Example I is repeated employing tris(methylcyclopentadienyl)aluminum (13.2 parts) and a manganous acetate (13 parts) in dimethyl ether solvent (150 parts). The mixture is stirred and heated in a closed reactor under its autogenous pressure at 100° C. for six hours. The bis-(methylcyclopentadienyl)manganese is then treated with carbon dioxide (2000 p.s.i.g.) at a temperature of 130° C. The carbon monoxide pressure is maintained constant and the reaction is continued until no additional carbon monoxide is taken up. The reactor is then cooled, carbon monoxide and solvent vented, and the solvent recovered by condensation. The methylcyclopentadienyl manganese tricarbonyl is then steam distilled from the non-volatile impurities and purified by distillation.

*Example IX*

Tris(allylcyclopentadienyl)gallium (19.3 parts) is reacted with manganous phenoxide (18.1 parts) at reflux in 250 parts of diethyl ether. This reaction is conducted for eight hours. The bis(allylcyclopentadienyl)manganese is recovered by distillation.

We claim:
1. The process of making cyclopentadienyl manganese compounds comprising reacting at a temperature between about 0–250° C. a manganese salt with a tris(cyclopentadienyl hydrocarbon) group IIIA metal having the cyclopentadienyl moieties each bonded directly to the metal through a carbon comprising the cyclopentadienyl ring.
2. The process of claim 1 wherein the reaction is carried out in a solvent.
3. The process of claim 1 wherein the reaction product is thereafter reacted at a temperature between about 0–

250° C. with carbon monoxide to form cyclopentadienyl manganese tricarbonyl.

References Cited in the file of this patent

UNITED STATES PATENTS 2,839,552　　Shapiro et al. ----------- June 17, 1958

FOREIGN PATENTS 540,135 (15P.) Belgium -------------- Jan. 27, 1956

OTHER REFERENCES

Piper et al.: J. Inorganic and Nuclear Chemistry, 1955, Vol. 1, page 166 relied on.